I. E. FARR.
JOURNAL LUBRICATOR.
APPLICATION FILED JAN. 15, 1909.
926,476.
Patented June 29, 1909.
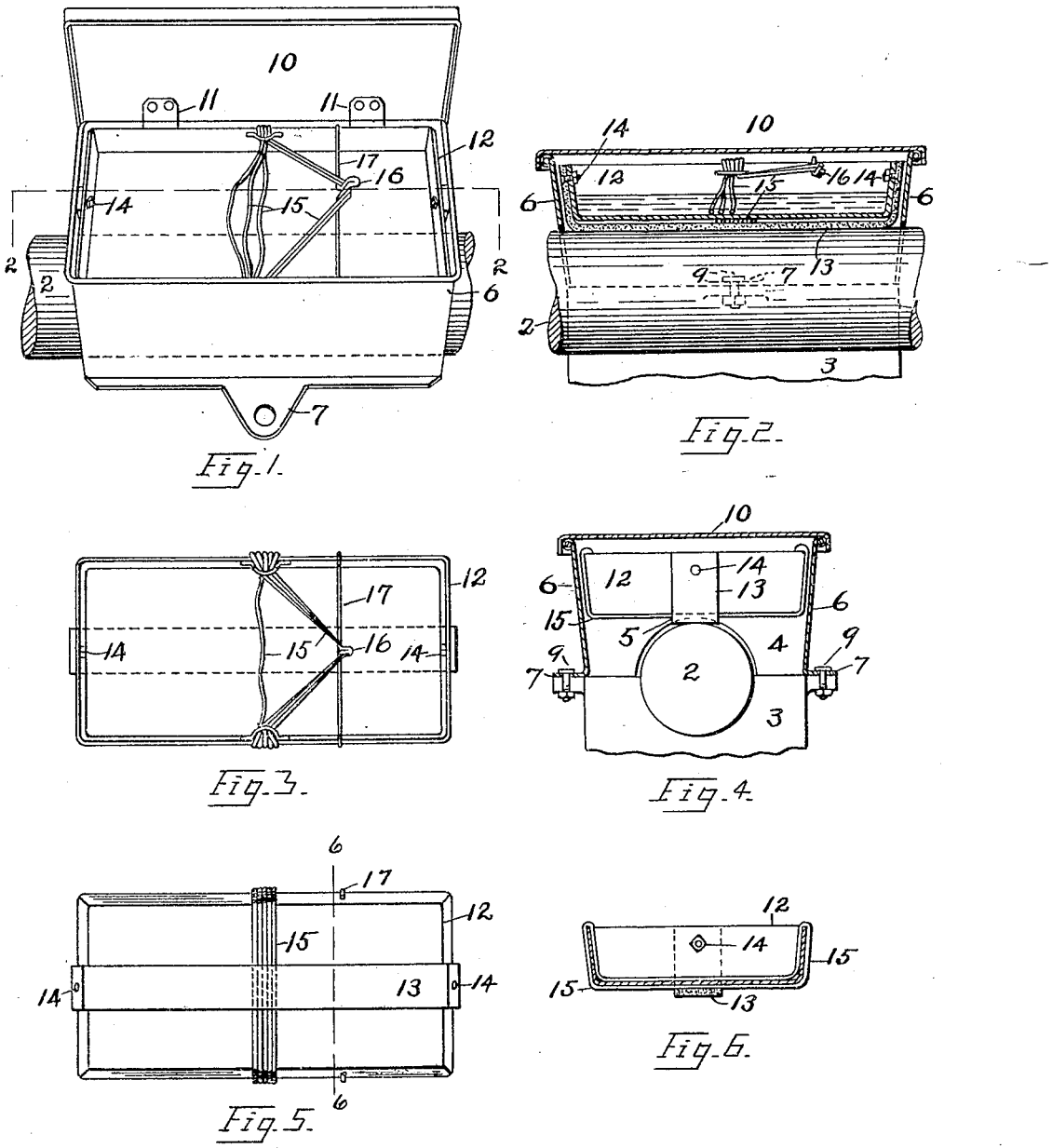
Witnesses:
Frank F. Brewer.
R. L. Wallace.
Inventor,
Ira E. Farr,
By Harry D. Wallace
Attorney.

UNITED STATES PATENT OFFICE.

IRA E. FARR, OF GREAT BEND, NEW YORK.

JOURNAL-LUBRICATOR.

No. 926,476.   Specification of Letters Patent.   Patented June 29, 1909.

Application filed January 15, 1909. Serial No. 472,407.

*To all whom it may concern:*

Be it known that I, IRA E. FARR, a citizen of the United States, residing at Great Bend, in the county of Jefferson and State of New York, have invented certain new and useful Improvements in Journal-Lubricators, of which the following is a specification.

This invention relates to improvements in lubricators for the journals of shafts in general, and the invention relates particularly to a device for lubricating the journals of the drier rolls of paper machines.

The object of the invention is to provide a lubricator which is simple, effective, clean and inexpensive.

The invention consists principally of an oil pan, and an endless wick, which carries the oil from the pan and delivers the same to a piece of felt, the latter placed in direct contact with the journal. And the invention further consists of simple means by which the flow of the oil may be increased or diminished at will.

Other features and parts of the invention will be understood from the detail description which follows, and by reference to the accompanying drawing forming a part of this specification, and in which—

Figure 1 is a perspective view of the complete device mounted on a journal, with the lid raised, showing the oil pan; also showing the wick, and the means for controlling the flow of the oil to the journal. Fig. 2 is a central longitudinal section, substantially on line 2—2 of Fig. 1, with the lid closed, showing the oil pan disposed in the casing; also showing a portion of the wick submerged in the oil for carrying a limited amount of oil to the felt which rests upon the journal. Fig. 3 is a top plan view of the oil pan with the casing removed. Fig. 4 is an end view, partly in section, of the complete device shown in Fig. 1. Fig. 5 is a bottom view of the oil pan. Fig. 6 is a cross section through the oil pan substantially as on line 6—6 of Fig. 5.

Similar numerals of reference are assigned to corresponding parts throughout the several views.

In the drawing, 2 represents a shaft, or the journal of a shaft, which is supported by and has its bearing in a pillow-block 3.

4 represents the cap or upper portion of the bearing-box, which may be constructed in any suitable manner, and which is slotted longitudinally, as at 5, to expose the upper side of the journal 2.

6 represents a casing preferably secured to the lower bearing part 3 by means of perforated lugs 7 and bolts 9. The upper side of casing 6 is open, and is provided with a cover 10, which is hinged to one side of the casing, as at 11.

12 represents an oil pan or reservoir which is loosely disposed in the casing 6, and is adapted to receive and hold a supply of oil or grease for use in lubricating the journal of a shaft for several weeks at one filling. This pan is preferably made of sheet metal, but may be cast or formed in any other manner, to carry out the purposes of the invention.

13 represents a strip of thick felt or like absorbent material, which is disposed lengthwise on the under side of the reservoir 12, the ends of the felt extending upwardly and secured to the ends of the pan by bolts or screws 14. The strip of felt is preferably cut substantially the same width as slot 5 of the cap, and its under side is intended to lie and bear for its full length upon the exposed upper side of the journal or shaft 2.

The casing 6 may be dispensed with if desired, and a cover like the part 10 may be hinged direct to one side of the pan the same as shown herein. The lubrication of the journal is accomplished directly through the agency of the felt 13, which receives the oil from a wick 15, which preferably consists of a number of coarse strands of wicking or like absorbent material, preferably of equal length and endless. The strands of the wick are not intended to be interwoven or plaited, but preferably lie close together, so that each strand may act as an individual conductor for the oil. To apply the wick to the journal direct would soon result in the wick becoming filled and clogged up from the heat of the journal and dirt which is present in such bearings. The wick is therefore not intended to make direct contact with the journal, but is preferably disposed between the bottom of the pan and the felt; the felt being applied in such manner that it closely contacts with the wick so as to readily absorb the oil carried by the latter. The several strands comprising the wick are preferably made the same length, and they extend laterally around the pan with sufficient slack, to allow the portion of the wick which traverses the open side of the pan to gravitate to, and lie submerged in the oil, on the bottom of the pan. The oil is then carried by the separate strands of the wick over the opposite side edges of the pan, and thence downwardly to the felt by capillary attraction. The strands being separable and independent of each other, it is possible to supply oil to a journal to the full extent of the carrying capacity of the wick. But in case a less amount of oil than the number of strands are capable of supplying is desired, then one or more of the strands may be lifted out of the oil, and suspended near the top of the pan by means of a hook 16, which is formed on a rod 17, the latter being secured to the opposite sides of the pan, as shown in the drawing.

The drawing shows a wick comprised of five strands, a greater or less number of strands may be employed, and the strands may be either coarse or fine, as may be desired, to carry out the objects of the invention. Figs. 1 and 2 show three of the strands in the oil, and two strands withdrawn and supported by the hook 16. The three strands will carry enough oil from the pan to the felt pad 13 to lubricate a shaft to a certain extent. But if it is found that the three strands furnish more or less oil than is necessary to properly lubricate a journal, then more of the strands may be withdrawn from, or returned to the oil, and the flow of the oil will be increased or diminished until the desired result is obtained. To stop the feed of the oil entirely, all of the strands may be hung on the hook 16. When but a slight feed of oil is required, all but one of the strands may be lifted out of the oil, as shown in Fig. 3. Under this arrangement, in view of the number of strands employed for the wick, the oiling of a bearing may be gaged very finely, and the exact amount and no more oil will be delivered to a bearing than is desired.

The present invention, while applicable for lubricating journals and shaft bearings in general, has been designed particularly for use in connection with the drier rolls of paper machines. The bearings and journals of the drier rolls are necessarily always hot, due to the use of steam for drying the paper. This normally heated condition of the bearings causes the thinning of the oil or grease employed for their lubrication and unless the oil is applied in a proper and careful manner, it will escape from the bearings and drip on to the heavy and expensive felt belts employed on the drier rolls, and soon rots and otherwise damages them. In the past numerous devices and systems have been devised and employed for lubricating these machines but they have all proven faulty in one respect or another. To obviate the defects of the old devices I have provided the oil pan 12 which may readily be applied to any bearing, and the felt 13 arranged to bear directly upon a portion of a journal, and also the wick 15 with its separate strands to carry the oil from the pan to the felt. All of these parts are then inclosed in a dust proof casing. The device is so arranged that it is readily accessible without requiring the removal of any bolts, and the flow of the oil to the bearings may be gaged and controlled in the simplest manner for effecting the perfect, clean, safe and cheap lubrication of journal bearings. By the employment of the wick with its separable strands there need be no waste of the oil. The wick will only carry the purest portion of the oil to the bearing, leaving all of the grit and other impurities in the pan from which it may be removed with slight work at any time.

Lubricators having wicks and felt to carry and apply the oil to journal bearings have been devised and used in the past, but none of these devices, so far as I am aware, employed a wick comprising a number of independent strands, capable of being operated all together, as one part, or separately as individual conductors, for the purpose of increasing or diminishing or measuring the flow of the oil to the felt and thence to the journal, in the manner herein shown and described.

Having thus described my invention, what I claim as new and desire to secure by Letters Patent, is—

An oil reservoir comprising an open pan, a wick comprising a number of independent strands encircling said reservoir, a portion of the said wick adapted to settle and lie upon the bottom in said pan, the said wick adapted to carry oil from said pan to the under side thereof, the strands of said wick capable of being separated and withdrawn from the oil for increasing, diminishing or stopping the flow of oil from said pan, a strip of felt applied to the bottom of said pan in a manner to contact with said wick and adapted to absorb the oil carried by said wick from the pan, the said felt arranged to contact directly with and to deliver oil received from the wick to the surface of a journal, and a hook supported by said pan adapted to receive and hold one or more of the strands of said wick away from the oil in said pan for the purpose of increasing or decreasing the feed of the oil to the journal.

In testimony whereof I affix my signature in presence of two witnesses.

IRA E. FARR.

Witnesses:
WILLIAM K. PECK,
WILLIAM S. OLMSTED.